United States Patent

[11] 3,627,105

| [72] | Inventor | Donald T. Prodzenski<br>Glen Ellyn, Ill. |
|---|---|---|
| [21] | Appl. No. | 863,896 |
| [22] | Filed | Oct. 6, 1969 |
| [45] | Patented | Dec. 14, 1971 |
| [73] | Assignee | Alpeda Industries, Inc.<br>Golf, Ill. |

[54] PLASTIC BOTTLE UNSCRAMBLER
14 Claims, 5 Drawing Figs.

| [52] | U.S. Cl. | 198/33,<br>221/162 |
|---|---|---|
| [51] | Int. Cl. | B65g 47/26 |
| [50] | Field of Search | 198/33.1;<br>221/151, 162, 165, 166, 167, 168, 169, 170, 160,<br>161 |

[56] References Cited
UNITED STATES PATENTS

| 1,541,846 | 6/1925 | Purinton | 221/167 |
| 2,636,319 | 4/1953 | Knight | 221/167 X |
| 2,777,561 | 1/1957 | Rose | 198/33.1 |
| 3,021,980 | 2/1962 | Gladfelter et al. | 221/167 |
| 3,249,203 | 5/1966 | Aidlin | 198/33.1 |
| 3,295,659 | 1/1967 | Aidlin | 198/33.1 |

Primary Examiner—Evon C. Blunk
Assistant Examiner—Hadd S. Lane
Attorney—Hill, Sherman, Meroni, Gross & Simpson ABSTRACT: Plastic bottles are adapted to be dumped randomly from a bulk supply into a receptacle wherein they are longitudinally oriented and from which the oriented bottles are taken off. More specifically, a rotary unscrambling drum on an oblique axis has a flaring, frustoconical rim provided with orienting pockets from which misaligned bottles are automatically ejected while the properly aligned bottles are delivered to a takeoff device.

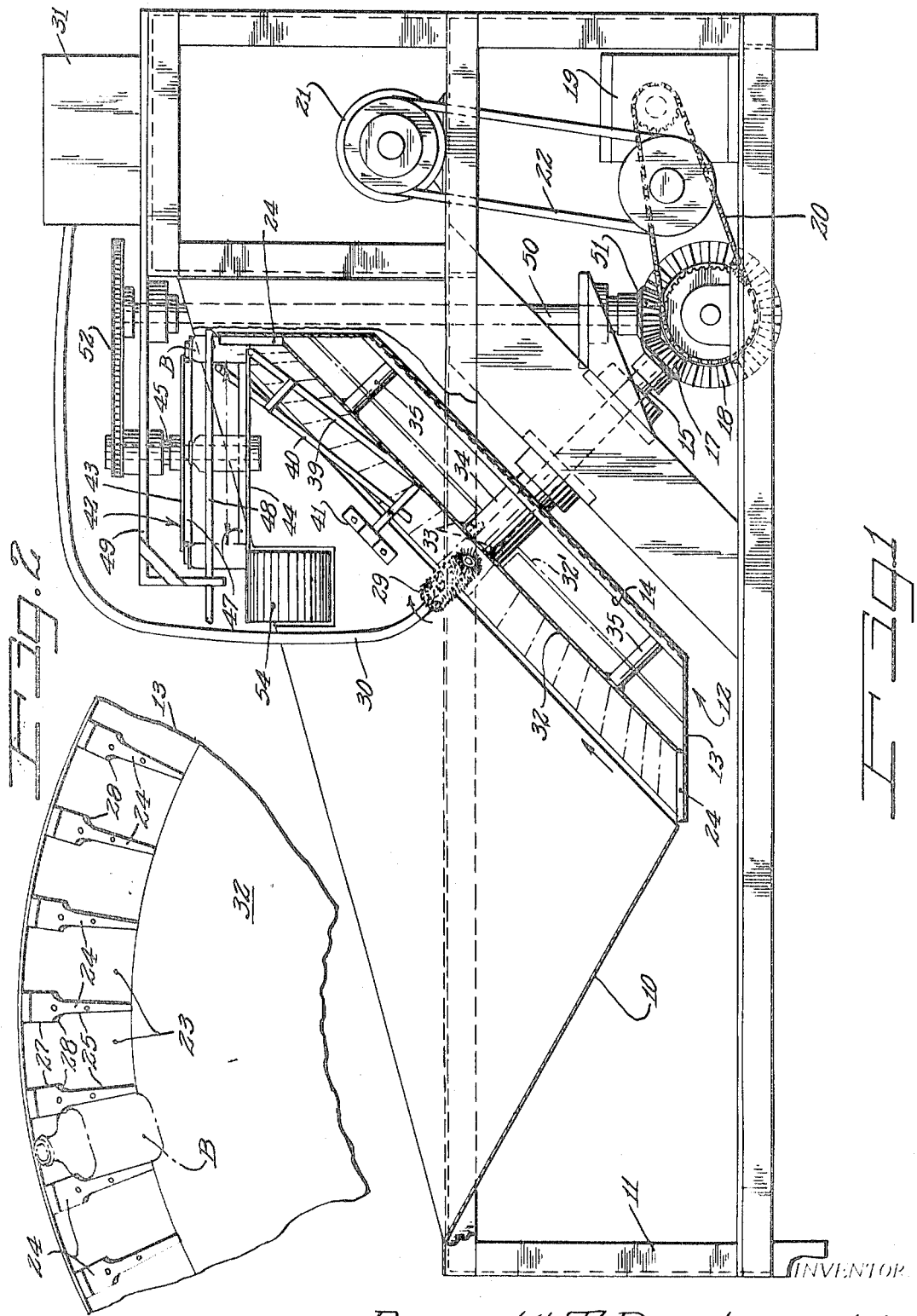

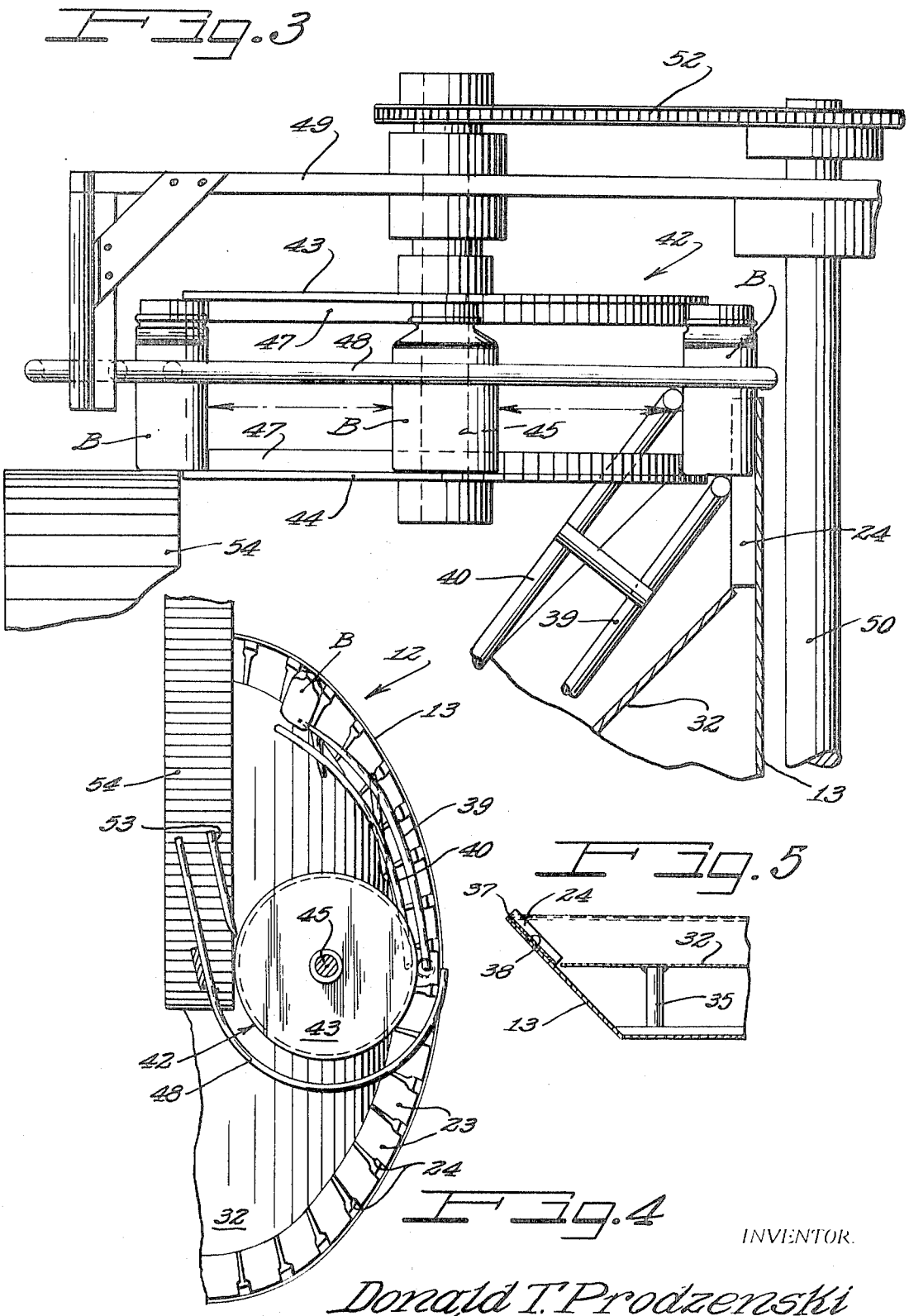

PLASTIC BOTTLE UNSCRAMBLER

BACKGROUND OF THE INVENTION

1. Field of the Invention

This invention relates to the unscrambling of bulk plastic bottles, and is more particularly concerned with a method of and means for orienting randomly dumped plastic bottles.

2. Prior Art

Smaller sizes of plastic bottles as produced in high-speed shaping or blowing machinery are generally randomly delivered into containers from which they are then hand picked and racked or placed on or in handling equipment for filling and any processing necessary prior to filling. This is a time-consuming, tiring and relatively inefficient method with low production results.

SUMMARY OF THE INVENTION

According to the present invention, the foregoing and other disadvantages, shortcomings, inefficiencies and problems are overcome by plastic bottles being adapted to be dumped randomly from a bulk supply into a receptacle wherein they are longitudinally oriented and from which the oriented bottles are taken off.

An object of the present invention is to provide a new and improved means for unscrambling plastic bottles.

Another object of the invention is to provide a new and improved plastic bottle unscrambler into which plastic bottles are adapted to be dumped randomly, and are oriented longitudinally to be taken off in the oriented position.

Another object of the invention is to provide a new and improved apparatus for unscrambling plastic bottles whereby the bottles may be dumped randomly into a receptacle and therein longitudinally oriented to be taken off in the oriented position.

Still another object of the invention is to provide a plastic bottle unscrambler which is readily adapted to receive and unscramble bottles of various sizes and shapes.

Other objects, features and advantages of the invention will be readily apparent from the following description of a preferred embodiment thereof taken in conjunction with the accompanying drawings although variations and modifications may be effected without departing from the spirit and scope of the novel concepts of this disclosure.

BRIEF DESCRIPTION OF THE DRAWINGS

FIG. 1 is a vertical sectional elevational detail view through an unscrambler embodying principles of the present invention;

FIG. 2 is a fragmentary plan view of the pocketed rim portion of the unscrambler drum;

FIG. 3 is an enlarged fragmentary elevational view, partially in section of the takeoff device of the apparatus;

FIG. 4 is a fragmentary top plan view of the takeoff portion of the device; and

FIG. 5 is a fragmentary sectional detail view through a modified drum liner structure.

DESCRIPTION OF THE PREFERRED EMBODIMENT

In a simple and efficient construction, a plastic bottle unscrambler (FIG. 1) comprises a hopper 10 supported by a suitable frame 11 and adapted to have dumped randomly thereinto bulk plastic bottles either as they are produced and delivered from a bottle-making machine or from containers in which the bottles have been stored or transported in bulk. For example, a bottler may receive a bulk supply of bottles randomly disoriented in containers from the bottle manufacturer.

In the hopper 10, the bottles are directed in a generally downward and rearward direction along the inwardly and downwardly sloping wall of the hopper to an unscrambling receptacle 12 in the form of a generally frustoconical drum 13 may be made from sheet metal and has a flaring rim with its mouth end closely aligned with a complementary inner end of the hopper 10. On its bottom wall the drum has a reinforcing plate 14 and is mounted rotatably on a drive shaft 15. The shaft is driven by means comprising a bevel gear 17 on its lower end meshed with a bevel gear 18 driven from a gearbox 19 through a flexible transmission such as a sprocket chain 20. Power is supplied by an electrical motor 21 coupled to the gearbox as by means of a flexible transmission belt 22.

Bottles dumped into the hopper 10 descend into the drum 13 which is mounted on an oblique axis so that the lowermost rim perimeter portion extends substantially horizontally to facilitate dropping of the bottles B to lie in respective orientation pockets 23 (FIG. 2) on the inner side of the drum rim. These pockets are defined by equidistantly spaced bars 24 attached to rim and having sides complementally contoured to the outline of the particular bottles to be unscrambled. As shown, the bottles B are of the so-called square type, but round or other shaped bottles can be processed by varying the pocket outlines while the bottles may be oriented longitudinally in the pockets 23 with their neck ends extending in either direction. In order to have them extend toward the outer edge of the drum rim, the orientation bars 24 have edge contours which on their inner end portions 25 conform to the sides of the bottle from the base to the shoulder thereof, while rim portions 27 of the bars are contoured to provide clearance therebetween for the necks of the bottles and provide a juncture with the inner end portions 25 lateral shoulder 28 which while accommodating the bottles if properly oriented in the respective pockets will cause an improperly oriented bottle to remain displaced and unaligned. For example, if a bottle is reversed so that its neck end extends inwardly, its bottom end portion will be caused by the shoulders 28 to project upwardly on the shoulders so that in this nonoriented posture the bottle remains displaced as it is carried upwardly in the rotation of the drum, in this instance counterclockwise as indicated by directional arrow in FIG. 1, until the bottle encounters ejector means which displace the nonoriented bottle so that it will tumble to the bottom or starting point to find another pocket.

In a desirable form, the ejector means will comprise a counterrotating brush 29, preferably having an elongated brush periphery, such as cylindrical as shown although it may be tapered if preferred. The brush periphery is located to pass properly oriented bottles, but to eject nonoriented bottles by brushing them from the pockets 23 as they attain about midheight in the upward movement of the rotating drum rim. By preference, the ejector brush 29 is mounted on a flexible shaft in a flexible conduit 30, enabling ready optimum adjustment of the brush relative to the unscrambler drum pockets. The flexible shaft may be driven from a motor 31 mounted on the rear portion of the frame 11.

For best results, the thickness of the orientation bars 24 should be properly related to the contours of the bottles to be handled. For example, in a substantially square cross section bottle the thickness may be about one-third the thickness of the bottle. For round bottles the thickness of the bars should be sufficient to reach slightly more than one-half the diameter. Thereby, he ejector brush 29 can be adjusted to wipe across properly oriented bottles without displacing them from the respective pockets, but any bottle that is not properly aligned within its pocket will either be joggled into proper alignment or will be ejected.

To facilitate orientation of the bottles in the pockets 23 and to guide ejected bottles to the starting point, the base wall 14 of the drum 13 may be located adjacent to the inner ends of the pockets 23 to receive the base ends of the pockets, but in order to adapt the drum to handle bottles of different lengths but same shape, the pocket rim of the drum is desirably longer than the longest bottle intended to be processed, and adjustable adapter or liner plate 32 is provided which is of a diameter to lie sufficiently closely to that diameter of the drum rim to which the bottom ends of the bottles to be processed will reach when they are oriented in the pockets 23. In one desirable form, the plate 32 is centrally secured as by means of screws 33 to a central hub 34 which is corotatively fixed on the baseplate 14. At suitable circumferentially spaced intervals, spacer legs 35 may be provided fixedly on and depending from the plate 32 to engage against the baseplate 14. In the instance illustrated, the plate 32 is of a diameter to lie adjacent to the inner ends of the orientation bars 24. Should longer bottles be processed, the plate 32 may be replaced by a plate 32' which is of sufficiently smaller diameter to reach the diameter of the drum rim at which the base ends of the bottles will lie when properly oriented in the pockets 23. For different shapes of bottles the orientation bars 24 may be replaced, or, if preferred, the drum 13 may be replaced where the volume of different shaped bars is sufficient to warrant having separate unscrambler drums for the respective different shapes. On the other hand, if changes for different shapes of bottles must be made with considerable frequency, the arrangement depicted in FIG. 5 may be preferred, wherein a separate annular orientation bar carrying liner 37 may be provided with a set of bars of the proper shape and length and secured to the drum rim as by means of screws 38 so that it can be quickly replaced when necessary. In this instance, the liner 32 may be either integral with the liner ring 37 or it may be separate as already described and interchangeable with a liner 32' as shown in FIG. 1 where longer bottles are to be processed in the same shaped pockets. It will thus be observed that wide adaptability for different sizes and shapes of bottles is afforded.

After properly oriented bottles on the drum are transported past the ejector brush 29, they are received by takeoff means. To this end, shortly after the ejector brush 29, means comprising a lift-out bar 39 (FIGS. 2 and 4) engages behind the base ends of the respective bottles which have been properly oriented in the pockets 23 and provides an incline up which the bottles gradually run in the continuing rotation of the drum, while a retainer and guide bar 40 maintains the body portions of the bottles in the pockets 23 so that the bars 24 continue to propel the bottles onward. To facilitate movement of the shoulder portions of the bottles past the shoulders 28, the bar shoulders are slightly tapered to provide leadout cam surfaces as shown in FIG. 2. The bars 39 and 40 may be connected in an assembly and detachably secured as by means of a bracket 41 to the adjacent portion of the hopper 10 for ready replacement by suitably proportioned sets of bars for different lengths or shapes of bottles.

At the top of the drum perimeter sweep, and wherein the drum rim extends vertically, the respective bottles B are delivered from the lift-out bar 39 to a takeoff wheel assembly 42 comprising in a desirable form opposed similar upper and lower wheels 43 and 44, respectively, corotative on a common shaft 45 and provided with respective rabbet shoulders 47 which are engageable with the bottom and neck portions of the bottles as they are delivered thereto and maintained in position by at least one complementary guide bar 48. Support for the shaft 45 and the guide bar 48 is desirably provided by an overhead bracket 49. Rotary movement of the takeoff wheel assembly 42 coordinated with rotation of the drum 13 is desirably effected by driving means comprising a vertical shaft 50 coupled through a beveled gear 51 with the driving bevel gear 18 and having a driving connection of its upper end with the shaft 45 through a flexible endless driving element such as a chain 52.

From he takeoff wheel assembly 42 the bottles may be guided by the guide bar 48 and a cooperating bar 53 parallel with the terminal portion of the bar 48 onto a takeoff conveyor 54 right side up as oriented by the unscrambler drum 13. If may be observed that if as the successive bottles B are delivered to the takeoff wheel assembly 42, the wheel does not sufficiently frictionally engage the bottles to move them onward through its impetus, the bottles will be urged onward by one pressing against the other as thrust by the orientation bars 24 by which the successive bottles are brought to the takeoff wheel.

According to the present invention, therefore, all that need to be done to effect rapid automatic orientation of the bottles is to dump them randomly into the receptacle comprising the unscrambler drum, and in the receptacle longitudinally orienting the bottles and then taking the oriented bottles from the receptacle.

I claim:

1. A plastic bottle unscrambler comprising:
   a receptacle into which the plastic bottles are adapted to be dumped randomly from a bulk supply;
   a series of bottle-receiving pockets in said receptacle for longitudinally orienting the bottles only when properly received in the pockets;
   said pockets moving in operation in a circuit from a position in which the bottles are received lying down to a position wherein the bottles are upright;
   takeoff means located to receive the bottles in the upright position; and means operative to elevate the bottles from the pockets to said takeoff means.

2. An unscrambler according to claim 1, said takeoff means comprising a rotary device receptive of the elevated bottles and operative to transport them away from said orienting means.

3. A plastic bottle unscrambler comprising:
   a receptacle into which the plastic bottles are adapted to dumped randomly from a bulk supply;
   means in said receptacle for longitudinally orienting the bottles;
   takeoff means comprising a rotary wheel device operating on a vertical axis and having peripheral flange means engageable with upper and lower ends of the bottles; and
   guide means operative to retain the bottles on the flanges.

4. A plastic bottle unscrambler comprising:
   a receptacle into which the plastic bottles are adapted to be dumped randomly from a bulk supply;
   means in said receptacle for longitudinally orienting the bottles, comprising a flaring rimmed drum having on its inner side an array of bars cooperating to provide a series of bottle-orienting pockets;
   said bars being on an outer end portion of the flaring rim; and
   a liner member mounted corotatively in the drum and having an edge located adjacent to the inner ends of the pockets to engage with the inner ends of the bottles oriented in the pockets.

5. An unscrambler according to claim 4, including a liner on the rim supporting said bars.

6. An elongated article unscrambler comprising:
   a receptacle in the form of a rotary drum having a frustoconical rim of substantial width and into which the articles are adapted to be dumped randomly from a bulk supply;
   means rotatably supporting the drum on an oblique axis wherein the lowest portion of the rim is located substantially horizontal and the highest portion of the rim is located substantially vertical;
   means on said rim within said receptacle for receiving the articles longitudinally oriented with their ends extending toward the outer edge of said rim; and
   takeoff means receptive of the oriented articles at the highest position of the rim during rotation of the drum.

7. An unscrambler according to claim 6, including a hopper leading to the lower portion of the drum and by which the articles are dumped into the receptacle.

8. An unscrambler according to claim 7, said hopper having edge structure in complementary adjacent relation to the lowest and adjacent portion of the rim.

9. An unscrambler according to claim 6, said means for receiving the articles comprising a circumferential series of receiving pockets on said rim and receiving the articles lying down in the lowest portion of the rim and presenting the articles in upright position to the takeoff means in the highest portion of the rim.

10. An unscrambler according to claim 9, including means located in an operative position between said lower portion of the rim and said highest portion of the rim within the receptacle in the uprunning direction from the lowest portion of the rim to eject improperly oriented articles from the pockets but passing properly oriented articles.

11. An unscrambler according to claim 6, including means to elevate the articles from said article-receiving means to said takeoff means.

12. An unscrambler according to claim 11, said takeoff means comprising a rotary device receptive of the elevated articles and operative to transport them away from said receptacle.

13. An unscrambler according to claim 6, and receiving means providing a circumferential series of pockets on said rim opening toward the edge of the rim.

14. An unscrambler according to claim 6, said receiving means comprising an array of bars cooperating to provide a series of article-orienting pockets.

* * * * *